United States Patent [19]
Wolf

[11] 3,937,852
[45] Feb. 10, 1976

[54] PROCESS FOR BAKING A COMPRESSED CRACKER

[76] Inventor: Irwin Wolf, 105 Rogers Drive, New Rochelle, N.Y. 10804

[22] Filed: July 5, 1973

[21] Appl. No.: 376,598

[52] U.S. Cl. ............... 426/560; 426/468; 426/505; 426/549
[51] Int. Cl.² .......................................... A21D 8/06
[58] Field of Search ........... 426/468, 505, 523, 346, 426/549, 560

[56] References Cited
UNITED STATES PATENTS

| | | | |
|---|---|---|---|
| 2,349,582 | 5/1944 | Tatosian | 426/468 |
| 2,606,510 | 8/1952 | Collings | 426/505 |
| 3,048,129 | 8/1962 | Noel | 426/505 |
| 3,780,193 | 12/1973 | DeJersey | 426/505 |
| 3,814,005 | 6/1974 | Widdel | 99/372 |

*Primary Examiner*—Norman Yudkoff
*Assistant Examiner*—Curtis P. Ribando
*Attorney, Agent, or Firm*—Lester Horwitz

[57] ABSTRACT

This invention provides a process for preparing a baked cracker which comprises placing a quantity of bakable dough having a rubbery consistency which tends to resume its original shape when free of compressive forces between two surfaces, compressing said quantity of dough therebetween by bringing said surfaces together for a predetermined distance and heating the dough while it is contained between said surfaces until baking is completed. There is also provided an apparatus for preparing baked products comprising a pair of plates and means for maintaining the surfaces of said plates a predetermined distance one from the other.

1 Claim, 4 Drawing Figures

U.S. Patent  Feb. 10, 1976  3,937,852
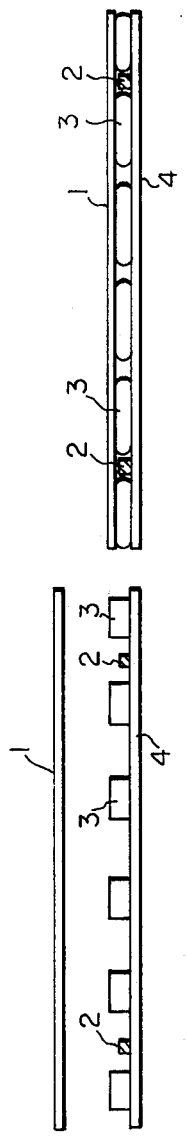
FIG. 1A
FIG. 1B
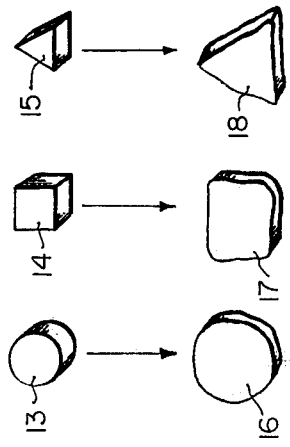
FIG. 1C
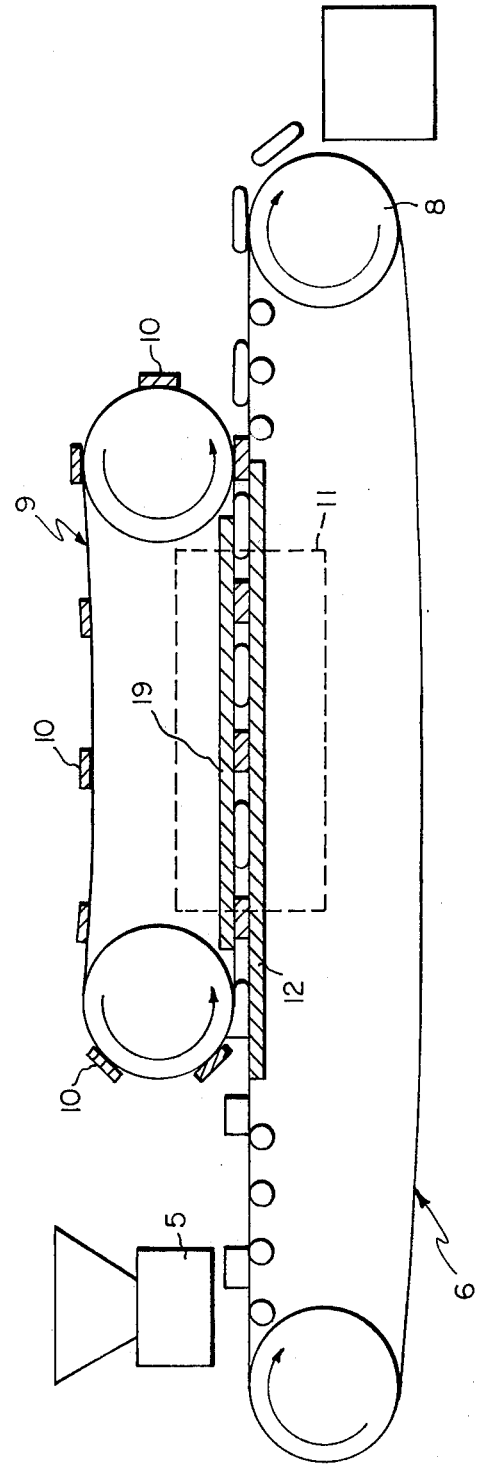
FIG. 2

PROCESS FOR BAKING A COMPRESSED CRACKER

CROSS REFERENCE TO RELATED APPLICATIONS

NONE

BACKGROUND OF THE INVENTION a. Field of the Invention

This invention deals with a process, and an apparatus therefor, for baking a dough of a rubbery consistency which tends to resume its original shape when free of compressive forces.

This invention also deals with an apparatus for performing the above process, said apparatus comprising a pair of plates and means for maintaining the surfaces of said plates a predetermined distance one from the other. Preferably said plate surfaces are part of a continuous band.

b. Description of the Prior Art

It is well known in the art to heat or cook doughy products when these are contained between two surfaces. However, in the prior art all such baking has been with respect to doughy mixtures of a liquid of fluid nature wherein the liquid dough is more or less heated in a mold therefor. The product obtained by this well known process is typically light, cellular in texture, and either soft and pliable, or brittle and easily fractured, without much strength. By contrast, this invention is directed to the baking of doughs having what can be termed a rubbery consistency, that is to say, this invention deals with the baking of doughs which tend to resume their original shape when freed or compressive forces. The product obtained by this invention is dense, firm and strong, and uniformly free of air pockets.

SUMMARY OF THE INVENTION

This invention deals with a novel process for the baking of a dough of rubbery consistency, i.e. one which tends to resume its original shape when free of forces of compression. Such a dough, when compressed into a shape, won't hold this shape.

In the conventional manner for baking such a dough one uses a "sheeter". Such dough to be baked is usually rolled into a reasonably thin sheet. This rolling is necessary also to attain the release of air from the dough. The sheets are then cut into desired sections, each comprising a unit of product. Often there is a waste of dough area between each cut unit, (i.e. when the cut sections are round).

When such a rubbery dough is rolled there is a tremendous problem encountered in view of the tendency of the dough to adhere to the roller, even if the roller is coated with a conventional release agent. Accordingly, to get a rubbery dough into a reasonably thin form so that it can be placed on a baking surface (a sheeter) it is necessary to overcome the tendency of the dough, as it is rolled, to stick or adhere to the roller. Also to attain a thin sheet of dough of rubbery consistency prior to its being baked into a cracker it is necessary to overcome the resistance of such dough to deformation and the tendency of the dough to retain its original configuration. The tendency of the dough to stick to the roller as it is being pressed free of air and thinned out has previously been overcome by constant dusting with flour, in addition to using rollers coated with release substances.

Other expedients utilized in attempting to readily roll out rubbery doughs has been to carefully adjust the temperature and pressure at which the dough was being rolled. Further expedients have been to try to control the moisture contents of such rubbery doughs which is necessary to avoid having the dough stick to the rollers or lose its original shape. Such adjustment of moisture content has led to the need for careful control of the atmosphere where such rubbery dough is being rolled, necessitating costly air-conditioning equipment. Further, considerable experimentation is required when new ingredients are added to the base rubbery dough mixture such as vegetables or edible seeds, which affect the moisture content of the dough and hence its stickiness and tendency to resist thinning. When such ingredients are added research into readjustments of time, pressure, temperature and humidity of the dough environment is required in order to secure a ready working of the rubbery dough. Accordingly, all these problems involved when a rubbery dough formulation is changed inhibit the manufacture of products of varying ingredients formed from a rubbery dough base.

A further requirement of the prior art is that the rolled dough is punctured prior to baking (docking) to permit gases formed on baking to escape, without unduly puffing the cracker.

According to my invention I have found that these problems and certain of these prior art steps can be overcome or eliminated by placing a quantity of bakable dough having a rubbery consistency and having a tendency to resume its original shape when free of compressive forces between two surfaces and then compressing said quantity of dough therebetween by bringing said surfaces together a predetermined distance and heating the dough until baking is complete while it is contained between said surfaces. My invention also includes an apparatus for carrying out the above process.

In a preferred embodiment of my invention the surfaces are parts of continuous bands whereby my process can be rendered continuous and also in my preferred embodiment the bands are subjected to a heating operation with the rubbery dough contained therebetween and the baked product then removed with the band surface being recycled to render the process entirely continuous.

I have found that several unexpected advantages flow from my invention. My process makes "docking" or the step of puncturing the dough to permit the release of gases from the baking dough needed by conventional procedures entirely unnecessary and thus completely eliminates a step required by the prior art. It also makes the cutting operation unnecessary, and also causes no waste of dough.

A further advantage of my invention is it tends to make the heating uniform. This is accomplished because the dough is compressed over the major portion of its area a uniform amount and thus is heated uniformly. Further, the use of heat conducting material for the surfaces constraining the dough helps to evenly and efficiently transmit the heat to both sides of the dough being baked.

A further advantage of my invention is that baked products, especially crackers, produced by my process have a "home-made" appearance and, therefore, are more appealing to the consumer. The texture and appearance of the product produced by my process can also be varied by having the surfaces of the plates or bands I employ embossed with any desirable configuration which will leave its imprint on the dough being baked and will produce a final product having a desired surface texture. By introducing deliberate variations in the size and shape of the original pellets, which were squeezed flat to form the cracker, the crackers may be made to appear hand made, while in fact having the uniformity of thickness and texture provided by machine manufacture, and enjoying the advantages of the lower costs of mass production.

A further advantage of my invention is that it permits the baking of a rubbery dough having any predetermined desirable thinness. This produces a cracker having highly desirable crispness and feel and, as has been indicated previously, one which has this desirable quality uniformly in the entire product. Thus, my process readily enables one to produce a final product which has a uniformly firm body devoid of flakiness.

Also, my invention enables one to add a variety of ingredients to the basic rubbery dough being baked and instantly be able to transform it to a final product of predetermined thickness without running into problems of careful control of temperature, pressure, and humidity during the rolling or forming operations. Variations in dough elasticity and viscosity and stickiness due to temperature and humidity conditions and the effect of added ingredients are rendered insignificant. In baking processes heretofore practiced, these factors are of great importance.

A further advantage of my invention is that it permits one apparatus to make a variety of different shaped crackers. By changing the overall shape of the pellets to be squeezed, (such as, triangular, oblong, square, toroidal, etc.) the ultimate major shape of the cracker may be determined. The shape of the pellets may be determined in the extrusion or compression processes.

In short, when the dough to be processed is a very stiff, gummy, sticky or rubbery dough, which is to be formed and baked, or if not baked, processed by other suitable means which are the equivalent of baking, it has been found that previously available bakery equipment for handling, rolling, sheeting, cutting, and baking operations is useless unless such dough is liberally and frequently dusted with dry flour on its surfaces, the difficult properties of the dough rendering standard equipment inefficient and ineffective. Since dusting with flour during processing is undesirable with respect to taste, production efficiency, ease of sanitation and good housekeeping practices and, most important, results in an inferior product, my invention for processing the dough is the essence of this inventive procedure.

Novel attributes of my invention and its advantages with respect to existing art are as follows:

1. Very stiff, sticky and rubbery dough can be effectively handled in mass production. Baking equipment heretofore offered as standard equipment in the baking industry cannot effectively manipulate this type of dough.

2. It makes possible the production of the snack product without the necessity of certain standard operations and procedures common in the production of snack products heretofore offered. Examples: No docking is required, no dough conditioning and "relaxing" is required, no dusting with flour during processing is required, and no cutting of sheeted dough is required so that waste is also eliminated. The elimination of these steps is an entirely unexpected improvement particularly as I achieve a superior product while, at the same time, eliminating costly steps.

3. My process permits the processing of the snack product dough over a wide range of temperature and moisture conditions within the dough ingredients, and in the ambience as well, without need for compensating adjustments in the proportions of ingredients, dough preparation, or controlled room temperature or humidity during manufacture.

4. My invention produces a product having the appearance of a hand-made, "home-made" snack, thus enhancing its appeal, while retaining the advantages of being manufactured by mass production techniques. Other products heretofore produced have the regular appearance commonly identified with manufacture by machine.

5. My invention offers the possibility for the product to be produced in various sizes, shapes and configurations, while still retaining its home-made appearance.

Advantages of the product produced by my invention with respect to a cracker made from a rubbery dough composition are 1, It has a desirable degree of crispness and firmness, for pleasant chewability.

2. it has thinness and texture heretofore difficult to obtain, such as to provide a distinctive feel in the mouth and a pleasing appearance in the hand.

3. It is firm enough to resist breaking while used with thick dip dressings, or for hors d'ouvres, but not so hard as to be brittle. Other snack crackers and also potato chips heretofore offered for these purposes are found to break easily while being prepared with dips or spreads, and come apart awkwardly while eaten.

4. It is uniformly dense, without random air pockets which are found in other snack crackers and products heretofore offered in various forms and shapes.

5. It is suitable to be used with numerous types of flavoring ingredients such as onion, garlic, cheese, bacon, smoked meat, various condiments, seasonings, herbs and seeds while still retaining the advantageous properties as above.

It is obvious the product produced by the process of my invention may be made into various forms and shapes.

The apparatus which is useful in the practice of my invention can be illustrated in FIGS. 1 and 2.

FIG. 1 illustrates a batch type cracker molder and carrier

FIG. 2 illustrates a continuous band oven type molder.

In carrying out my process using the batch type of molder illustrated in FIG. 1 the following steps are taken Step 1. Is the deposit of rubbery pellets on the bottom plate in any desired array.

Step 2. Clamp the top plate to the bottom plate, with spacers for desired thickness of cracker.

Step 3. Bake molder and dough in oven.

Step 4. Disassemble clamped plates, remove finished crackers and return molder to loading process.

It is obvious that the plates may be clamped together by any suitable means, while including the spacers. The spacers can preferably be approximately one-eighth to one-sixteenth inch in height for the control of cracker thickness. Such spacers can be protuberances in the top and/or bottom plates which maintain the plates a desired distance apart.

The thickness of the plates will depend on the material and stiffness of the material used, and the dimensions of the pressure plates. It is very important that the plates be strong enough to force the heavy rubbery dough into shape and to resist any deformation of the dough without losing the uniformity of desired spacing for thickness of the cracker. Textured surfaces provide a more attractive appearance. Tetrafluoropolyethylene (TFE) or equivalent release coatings aid in clean efficient processing. The pressure plates may be any suitable size, and are typically the size of standard baking pans, so that they may fit evenly into the oven pans and into various standard materials handling carts and racks, etc.

Auxiliary equipment which may be used in the practice of my invention is as follows 1. Suitable standard measuring and weighing apparatus to prepare the ingredients.
2. Standard chopping, blending and mixing equipment to produce the dough.
3. Equipment designed to form the dough into pellets, either spherical, partially spherical, cylindrical, triangular, toroidal, cubic or in any desired shape, such that each of these pellets may be further formed into a cracker, according to the design of the product desired. This equipment should be capable of depositing these pellets in a suitable array on the cracker forming apparatus.
4. Equipment designed to compress and compact the pellets to remove air pockets contained in the dough after the pellets were formed. Such equipment may also be designed to compress and compact the pellets to remove air pockets simultaneously with the pellet formation.
5. Special equipment, part of this invention, to form the pellets into individual crackers, and to act as carriers of the unbaked cracker forms into the oven for baking.
6. Standard oven equipment having a timed bake cycle, with automatic transport of the dough into and out of the heat zone. Typical types are the rotary oven, traveling oven, and continuous band oven (tunnel oven).
7. For very high production rates, special oven equipment, part of this invention, consisting of a new type of continuous band oven herein described.
8. Standard equipment for materials handling and storage.

BRIEF DESCRIPTION OF THE DRAWING

FIG. 1 shows a batch type cracker molder and carrier.

In this embodiment in FIG. 1a, 1 shows a top pressure plate. A plate made of aluminum metal is preferable as this helps reduce hot spots and uneven baking because of the superior heat conductivity of aluminum. A tetrafluoropolyethylene coated surface is preferable. A tetrafluoropolyethylene coated textured surface is most preferable. The dough pellets 3 are placed at the bottom pressure plate 4 in any desired manner. The spacers 2 are for keeping the plates apart the desired distance.

FIG. 1b shows the loaded cracker molder clamped together. A preferable spaced distance is about one-eighth to one-sixteenth inch for a suitable cracker thickness. The spacer 2 can be a plug randomly placed over the surface or can be suitable protuberances in the top and/or bottom plates.

FIG. 1c shows examples of dough pellets before 13, 14 and 15 and after 16, 17, 18 the pressure is applied.

FIG. 2 shows the continuous band oven type cracker molder of this invention. A loading zone 5 deposits dough pellets on the lower conveyor belt 6 comprising a band, preferably a solid steel conveyor band for suitable rigidity, which may be supported by a flat surface 12 while traveling through the heat zone and which is driven by motor means 8. This machine 5 will preferably extrude, form or roll or partially compress the pellets prior to their deposition on the band, so as to remove entrapped air and to make the dough more dense. In addition there is an upper band 9 driven by the same or separate motor means as the lower band to move in th same direction as and uniformly with the lower band 6, said upper band containing suitable spacers 10 to keep the band surfaces a predetermined space apart. Said upper band may also be supported by a flat surface 19 while traveling through the heat zone. When the bands meet at the input end, the dough is compressed to the desired thinness and the compressed dough passes through a heating zone 11. After heating (or baking) is completed the bands separate and suitable means, such as a scraper on the upper band, are preferably utilized to remove the baked dough product which is collected and removed.

It is to be understood that either the upper or the lower band, or both, can carry the spacers. Further, the upper and lower bands may come together abruptly as shown in the drawing. However, these bands may also be caused to come together gradually before they run parallel. The upper and lower bands would, of course, run parallel one to another in the heating zone. It should also be understood that either the upper or the lower band, or both, may be textured so as to provide a textured surface to the finished product.

DESCRIPTION OF PREFERRED EMBODIMENTS

Example 1

A typical formulation of base ingredients for a rubbery consistency dough useful for example as a cracker base utilized in this invention is 4½ cups wheat flour
3½ oz. vegetable or cooking oil
4 oz. water These ingredients, when mixed with flavoring ingredients, will yield about 1½ pounds of snack product when processed as later described.

The above cracker base ingredients may vary as follows:

wheat flour — 3½ cups to 5 cups (a few percent of the wheat flour may be replaced by a few percent of soy or cottonseed flour).
oil — 3 to 4 oz. (may be replaced by equivalent amount of hydrogenated vegetable shortening).
water — 3½ to 4½ oz.

A rubbery dough will result from these ingredients in the proportions shown for use in the invention.

Sample flavoring ingredients to be added to the above base ingredients poppy seeds
salt
pepper and/or chopped onions A specific example of flavor ingredients which may be added to the above cracker base ingredients are

| | |
|---|---|
| sesame seeds | 2 tbsp. |
| salt | 4 tsp. |
| garlic (chopped) | 1 oz. |

A further specific example of the flavor ingredients which may be added to the above cracker base ingredient

| | |
|---|---|
| caraway seeds | 4 tsp. |
| salt | 4 tsp. |
| pepper | ⅝ tsp. |

Similarly other flavoring ingredients previously listed may be used in numerous combinations, while maintaining the desired properties of the cracker.

It is preferred that the dry ingredients be mixed well first, and the wet ingredients then added to the mixture. The oil and water may be mixed first by stirring or blended by standard means, and then added to the dry mixture. The resulting mixture is then kneaded and mixed until of uniform consistency.

The dough thus prepared is then fed into the equipment designed to form it into pellets for further processing. Several methods are possible:

a. Sheeting the dough to a relatively thick cross-section in special equipment coated with fluorocarbon non-stick material, and then punching out the pellets onto the carrying surface of the forming apparatus in desired array.

b. Compressing the dough through extrusion orifices and cutting off the desired amount for each pellet.

c. Rotary die process designed to deposit the pellets in place for further processing.

While the pellets are being formed it is highly preferable that all air pockets be removed. This should preferably be performed prior to further shaping of the product or simultaneously with the final shaping or squeezing of the product. The removal of air pockets may be accomplished, for example, by the compression of rolling the dough upon itself, as in shaping a sphere or cylinder.

Example 2

This is another example of the formation of a cracker by the process of this invention. These are produced by squeezing the pellets formed of about three-fourths inch diameter × three-eighths inch thick of the rubbery dough formulation of the type set forth in Example 1 between two flat metal surfaces which are coated with fluorocarbon release film, and which are spaced apart approximately one-eighth to one-sixteenth inch. An appropriate design may be embossed or engraved on the surfaces to be in contact with the dough. This apparatus not only forms the cracker to final shape, but is used as the carrier of the dough thus shaped into the oven throughout the baking process. Baking is done at 400°–450°F. for about 17–20 minutes or, if desired, at 350°F. for about 30–40 minutes.

I claim:

1. A process for preparing a baked cracker which comprises compressing between two surfaces at a distance of about one-eighth to one-sixteenth of an inch a quantity of bakable dough having a rubbery consistency which tends to resume its original shape when free of compressive forces and wherein said dough consists essentially of wheat flour, and wherein a few percent of said wheat flour is replaced by a few percent of soy or cottonseed flour, vegetable or cooking oil, or an equivalent amount of hydrogenated vegetable shortening and water between two surfaces, present in amounts in said dough in the ratio of 3½ cups to 5 cups wheat flour to 3 to 4 ounces oil to 3½ to 4½ ounces water, and baking said dough while it is compressed between said surfaces.

\* \* \* \* \*